(12) United States Patent
Espinosa

(10) Patent No.: US 7,325,409 B2
(45) Date of Patent: Feb. 5, 2008

(54) VACUUM STORAGE APPARATUS WITH SLIDING DRAWERS

(76) Inventor: Edward P. Espinosa, 3940 Sunshine Canyon Dr., Boulder, CO (US) 80302

( * ) Notice: Subject to any disclaimer, the term of this patent is extended or adjusted under 35 U.S.C. 154(b) by 242 days.

(21) Appl. No.: 11/048,141

(22) Filed: Feb. 1, 2005

(65) Prior Publication Data

US 2006/0117763 A1    Jun. 8, 2006

Related U.S. Application Data

(60) Provisional application No. 60/555,991, filed on Mar. 24, 2004.

(51) Int. Cl.
*F25F 3/16* (2006.01)
*F25B 19/00* (2006.01)

(52) U.S. Cl. .................. 62/78; 62/169; 62/268

(58) Field of Classification Search ............ 62/78, 62/100, 169, 176.1, 268, 270, 441
See application file for complete search history.

(56) References Cited

U.S. PATENT DOCUMENTS

| | | | | |
|---|---|---|---|---|
| 1,404,400 A | * | 1/1922 | Moon ........................... | 62/161 |
| 2,894,845 A | * | 7/1959 | Stoddard ..................... | 426/419 |
| 3,116,610 A | * | 1/1964 | Whitmore ..................... | 62/100 |
| 5,046,332 A | * | 9/1991 | Herrmann et al. ............ | 62/388 |
| 5,095,717 A | * | 3/1992 | Germi ........................... | 62/382 |
| 5,142,970 A | * | 9/1992 | ErkenBrack ................. | 99/472 |
| 5,195,427 A | * | 3/1993 | Germano ..................... | 99/472 |
| 5,271,240 A | * | 12/1993 | Detrick et al. ................ | 62/268 |
| 5,347,918 A | * | 9/1994 | Chen ........................... | 99/472 |
| 5,522,216 A | * | 6/1996 | Park et al. .................... | 62/3.6 |
| 5,605,047 A | * | 2/1997 | Park et al. .................... | 62/3.6 |
| 5,946,919 A | | 9/1999 | McKinney | |
| 6,090,422 A | * | 7/2000 | Taragan et al. ............. | 426/231 |

FOREIGN PATENT DOCUMENTS

JP      2000-2479 A  *  1/2000

* cited by examiner

*Primary Examiner*—Mohammad M. Ali
(74) *Attorney, Agent, or Firm*—Jeffrey S. Melcher; Manelli Benison & Selter, PLLC

(57) ABSTRACT

An apparatus for storing, preserving and dispensing perishable and degradable food and goods having a rigid housing. At least one modular unit is removably disposed in the rigid housing for holding items. The modular unit has a storage unit and a drawer constructed such that when the modular unit is removed from the rigid housing coolant and partial vacuum are retained in the modular unit. The storage unit seals the drawer when the drawer is closed within the storage unit, such that when the drawer is opened coolant is retained between the storage unit and the rigid housing when the modular unit is disposed in the rigid housing.

20 Claims, 3 Drawing Sheets

VACUUM STORAGE APPARATUS WITH SLIDING DRAWERS

RELATED APPLICATIONS

The present patent application is a continuation-in-part of U.S. provisional patent application Ser. No. 60/555,991, filed Mar. 24, 2004, for VACUUM STORAGE APPLIANCE, CONTAINER AND SYSTEM.

FIELD OF THE INVENTION

The invention relates to storing perishable foods and goods and, more particularly, to a modular vacuum storage apparatus and method for storing, dispensing, preserving and shipping perishable items.

BACKGROUND OF THE INVENTION

Removing heat from perishable foods and goods prior to storing or shipping them is a well-known technique with proven efficacy. Perishable goods are now stored or shipped routinely in all parts of the world. These measures can be enhanced by modifying and monitoring not only temperature, but also vacuum, humidity and gas mix levels in the surrounding food storage environment.

U.S. Pat. No. 5,946,919, issued to McKinney, et al., for FOOD CONSERVATOR SYSTEM on Sep. 7, 1999, discloses a single vacuum compartment appropriate for storing baked goods, in which a negative pressure of 10" Hg is maintained and wherein a humidity level of "at least about" 60% relative humidity is maintained. The environment of the compartment is feedback-controlled by a microprocessor. The microprocessor can control vacuum, relative humidity, temperature, the amount of ozone introduced into the compartment to retard bacterial growth, as well as, out-gassing time cycles. A menu allows a user to input data used to control the microprocessor, and permit optimization of the compartment environment for the particular foodstuffs presently being stored.

McKINNEY, et al., can include an ozone ultraviolet generator, a humidifier unit, and/or an activated charcoal chamber. Generating ozone and ultraviolet radiation helps retard or kill mold spores and other undesired components that may be present. The inclusion of an activated charcoal chamber helps further combat odors and removes carbon dioxide by-products.

The enclosure or compartment of McKINNEY, et al., however, has no mechanism for separating foodstuff or for accessing certain perishable items without accessing all of them. This is a serious drawback, as the vacuum is released when the front door is opened. Moreover, the temperature of all remaining perishable items is affected by the door opening in order to access other items or insert them into the container. Likewise, humidity is affected by such actions.

It would be advantageous to provide a perishable food and goods storage system capable of maintaining multiple compartments at predetermined vacuum, temperature, humidity and gas mix levels.

It would also be advantageous to provide a storage system that could accommodate a plurality of perishable foodstuff.

It would further be advantageous to provide a storage system that has a number of individually movable, modular drawers, each drawer being capable of holding different items.

It would still further be advantageous to provide a storage system with individual, movable, modular drawers with a single environmental control unit for the entire system.

It would still be further advantageous to provide a storage and dispensing system that uses one-way valve (or similar functioning mechanism) containers and/or bags to store, preserve and dispense items.

It would still be further advantageous to provide a system that automatically creates, maintains and releases various environments in respective storage units by modifying parameters such as: temperature, humidity, vacuum and gas mix levels and combinations thereof.

It would also be advantageous to program the apparatus to automatically turn off a particular operating system during peak usage to conserve electricity or for operation during specific time periods and intervals.

SUMMARY OF THE INVENTION

In accordance with the present invention, there is provided an apparatus for storing, preserving and dispensing perishable and degradable food, goods and materials for residential, commercial, and industrial applications. A rigid housing is provided, in which at least one modular unit is disposed. Physically removed from the modular unit is a vacuum pump for creating a partial vacuum environment. Optionally provided are operating systems to create, monitor, and maintain: temperature, humidity, and gas mix levels in the storage unit.

In the preferred embodiment, the modular unit is a slidable drawer. Moreover, more than one drawer can be provided, each drawer stacked above one another and all of the drawers being operatively connected to the vacuum pump and optionally to the temperature and humidity control device and the gas sourcing system.

The modular units can be either storage or processing units. The processing unit is designed to create a partial vacuum in one-way valve or similar functioning bags and containers placed into the unit.

The apparatus housings include closed and open frames and/or rack systems to hold single or multiple modular units. The modular units are standardized in size and coupling in order to allow the units to be moved from one housing to another. When a unit is removed from a closed housing another unit can replace it, or a cover can be placed into the housing opening to seal it. The removed modular units can be connected to portable operating systems and can be disposed side-by-side, like books on a shelf; or vertically stacked, like drawers in a dresser.

Furthermore, an apparatus can consist of a combination of processing and/or storage units and a closed housing can provide said units with or without a range of temperature.

BRIEF DESCRIPTION OF THE DRAWINGS

A complete understanding of the present invention may be obtained by reference to the accompanying drawings, when considered in conjunction with the subsequent detailed description in which.

DESCRIPTION OF THE PREFERRED EMBODIMENT

The invention can substantially extend the shelf-life, freshness and quality of a wide range of perishable and degradable items by controlling and/or eliminating their exposure to oxidation, moisture, insects, spoilage bacteria and other organic and non-organic chemical reactions that degrade items and accelerate ripening and decay.

The invention features a modular apparatus for storing, preserving and dispensing perishable and degradable food and goods. A rigid housing is provided, in which at least one modular unit is disposed. Physically removed from the modular unit is a vacuum pump for creating a partial vacuum; a temperature control unit for creating and maintaining a range of temperature (for closed housings); a humidity control unit for maintaining or modifying the humidity level; and a gas sourcing system for introducing and modifying the gas mix levels in each modular unit.

The apparatus offers a combination of unit environment settings applicable to preserve a wide range of perishable items. Multiple, independent and sealable drawers each have unique, preset storage environments depending upon use requirements. Each storage unit is engineered to store and preserve a particular type of perishable or degradable item. For example, food groups can consist of, but are not limited to: (1) breads and pastries; (2) dry goods (e.g., cereals, grains, herbs, coffee, etc.; (3) fruit; (4) vegetables; (5) meats; and (6) cheeses.

Figure 2:
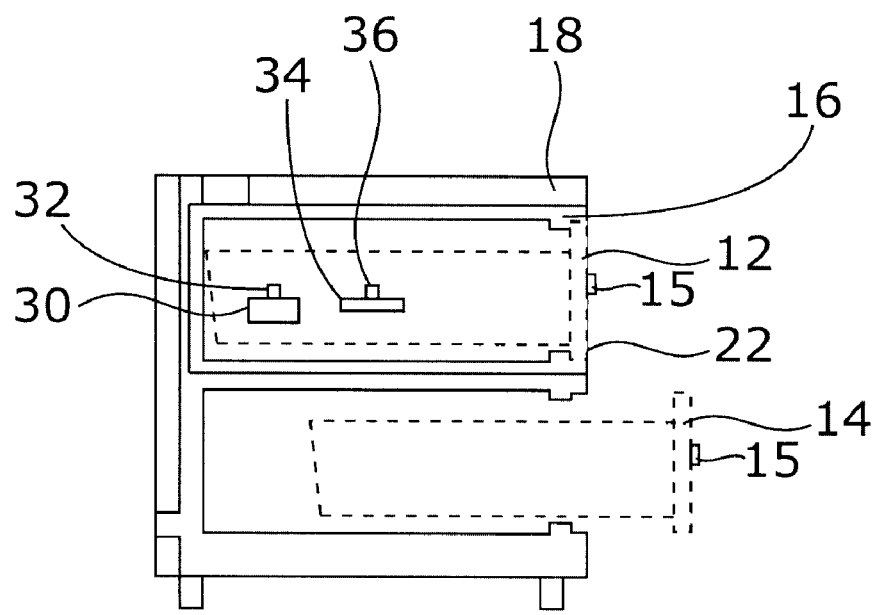
FIG. 2 is a side, cross section view of one embodiment of the invention.

The container processing unit is a modular unit designed to create a partial vacuum in one-way valve bags 34 and containers 30 (or variations thereof) to preserve the contents therein yet still store perishable items, as shown in FIG. 2. The one-way valves are shown at 32 for the container 30 and at 36 for bag 34.

When a processing unit is closed and sealed with a container inside, a sufficient preset partial vacuum is created within the processing unit, to in turn, create a partial vacuum environment within each respective container placed into the processing unit. When the processing unit is opened, the partial vacuum therein is automatically released; however, each processed container maintains its unique storage environment. The containers can then be inventoried either in the processing unit in a storage unit, or in other storage areas (e.g., the refrigerator, pantry, etc.).

The method for storing, preserving, and dispensing perishable and degradable food and goods consists of the following steps. The operator places the items to be preserved or stored into a one-way valve (or similar functioning mechanism) container or bag (or variation thereof) and then closes and seals the container or bag. The operator then places the bag or container into the processing unit and then closes and seals the processing unit. The processing unit then creates a sufficient vacuum environment within the unit, to in turn, create a partial vacuum within each one-way valve container or bag in the processing unit. When the processing unit is opened and the partial vacuum is released, each bag or container retains its unique storage environment until the bag or container is opened. Single or multiple bags and containers can be processed simultaneously. This method is applicable to any compartment or space that can create a vacuum or partial vacuum.

The inventive apparatus is scalable. In the preferred embodiment the apparatus consists of single or multiple independent, sealable processing and/or storage units that operate mechanically as drawers. Each unit is affixed into an insulated housing in which a temperature control system circulates air around the respective unit. In alternate embodiments, each unit can be removed from its respective housing, while retaining its sealed environment, and can stand alone, be placed in another housing or can be connected to portable humidity, vacuum and gas operating systems.

The units can be vertically or horizontally attached to other units using interlocking mechanisms. The apparatus' components, housings, modular units, and operating systems can be standardized and interchangeable.

Each processing and storage unit consists of preset and independent environments that are controlled, monitored and maintained by a centralized, preset programmable, microprocessing unit (CPU). The CPU communicates with the operating systems and the sensors and controls in each respective modular unit to create unique partial vacuum storage environments that may be modified by humidity, gas sourcing and temperature systems.

Operating systems are located outside of the respective storage unit environment. Each operating system connects to the CPU and the respective storage unit. The operating systems consist of a commonly shared vacuum pump and optionally a combination of any of the following: temperature control system (in the closed housing), relative humidity system, and gas sourcing system. The operating systems can also include ozone, filtration systems (e.g., activated charcoal) and any other systems to minimize odor and control bacterial growth.

Figure 1:
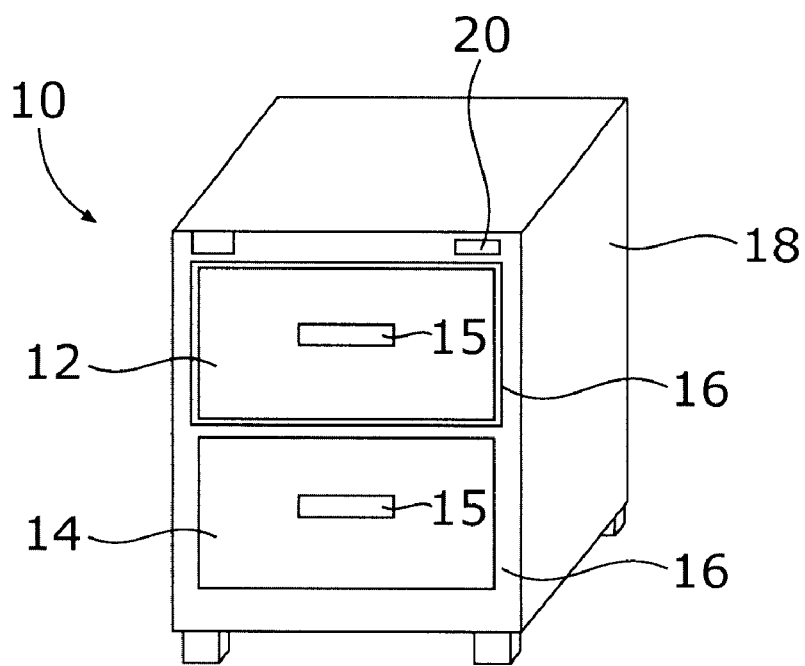
FIG. 1 is a perspective view of the apparatus in accordance with the invention.

Referring now to FIG. 1, the preferred embodiment contemplates single or multiple drawers, and here is shown a vacuum storage apparatus 10 with two slidable drawers 12, 14, each having a handle/latch mechanism 15, in a sealable storage unit 16 that is affixed to an insulated rigid housing 18. At least one of the drawers 12, 14 is slidable and can be removed from the storage unit 16. Air is circulated around each storage unit 16 in the housing 18 with the respective functions controlled and monitored by sensors 50 (FIG. 3) via a control panel 20. In this embodiment, the modular unit described above comprises the storage unit 16 containing the drawer 14.

Referring now to FIG. 2, when a storage unit 16, shown having a drawer 12 to provide a sealed space, is removed (shown in FIG. 4), a created environment within the storage unit 16 and drawer can be maintained. In this embodiment, the modular unit described above comprises the storage unit 16 containing the drawer 12.

The drawer 14 is shown in FIG. 2 as being sealed within the rigid housing 18 and not within a storage unit 16 and, thus, in this embodiment, the modular unit described above comprises the drawer 14 without a storage unit 16. Furthermore, the storage unit 16 can be placed into other rigid housings such as closed or open frames and rack systems or function independently of any housing. The storage unit 16 when removed from its rigid housing can be vertically and/or horizontally stacked and connected to portable vacuum, gas sourcing and humidity operating systems. The storage unit 16 is removed from or replaced into the rigid housing 18 by use of manual connection fittings and retractable operating system lines for the respective storage unit functions (vacuum, humidity, gas mix and control panel), in a manner well known in the art.

Figure 4:
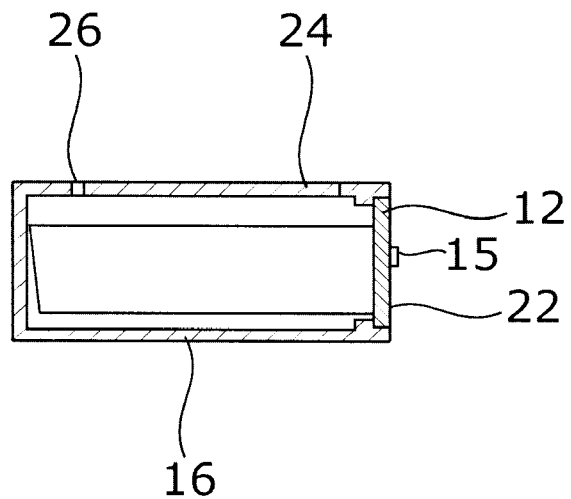
FIG. 4 is a side, cross section view of a modular unit shown in FIG. 2 removed from the rigid housing.
Figure 5:
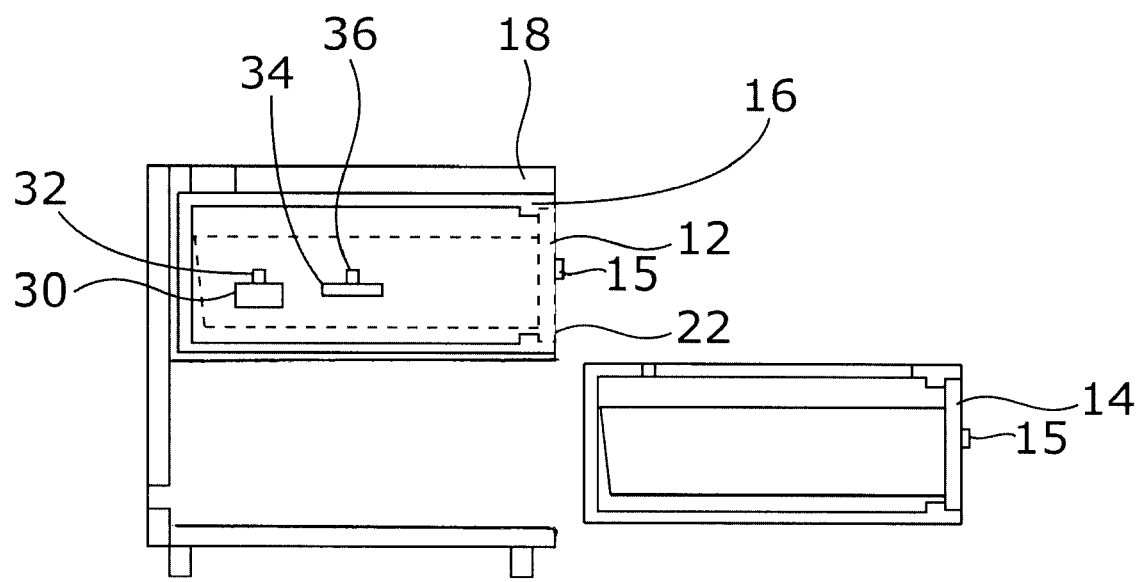
FIG. 5 is a side, cross section view of the apparatus showing another rigid housing, and a plurality of modular units.

A hinged door 22 can optionally be provided to seal the housing 18 holding the storage unit 16 to maintain the temperature for the housing and unit, which is shown in FIG. 4.

Figure 3:
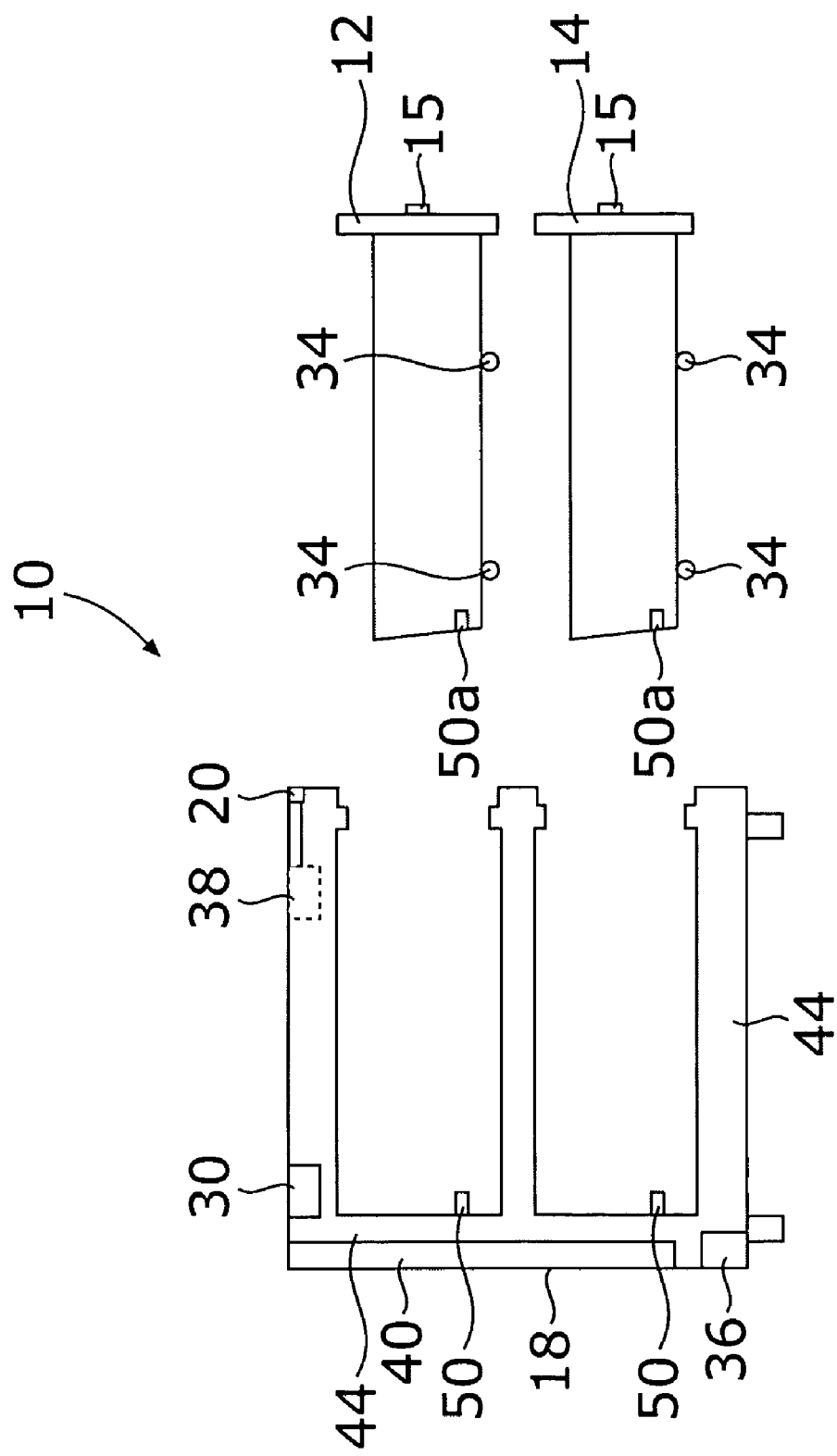
FIG. 3 is a side, cross section view of an alternate embodiment of the invention.

Storage unit 16 can also include a removable or hinged top 24 (shown in FIG. 4) that opens and closes the storage space. When the lid 24 is closed, a seal, not shown, allows a partial vacuum to be created. When the lid 24 is opened, to add or remove items, the vacuum environment is released. The removable or hinged top 24 can also include latches 26 (shown in FIG. 4). Referring now to FIG. 3, there is shown the apparatus 10 with drawers 12, 14 removed from housing 18. A well or reservoir 30 is provided with a suitable lid, not shown, for receiving water for use by a humidifier, not shown, operatively connected to or in housing 18. Rollers 34 are rotatably affixed to the lower portion of each drawer 12, 14 or into housing 18 to facilitate sliding thereof. In this embodiment, the modular unit described above comprises the drawers 12 and 14 without the use of storage unit 16.

Also integral with housing 18 is a vacuum pump 36, electrically operated under control of a microprocessor 38 and display panel 20. A hot/cold temperature control subsystem 40 is disposed at the rear of housing 18 and, again, operated under control of a microprocessor 38 and display panel 20. A humidity line 44 is attached to each respective drawer 12, 14 when seated in housing 18 to create and maintain the desired level or range of humidity therein.

Temperature, vacuum, gas mix and humidity sensors 50 are provided for each storage unit 12, 14 supported by housing 18. The bank of sensors 50 is electrically connected to microprocessor 38. In the preferred embodiment, sensors 50 are also connected to suitable valves and couplings that mate with respective sockets 50a on the rear portions of drawers 12, 14. Other configurations of sockets, sensors, valves and couplings can also be devised, depending upon the preferences and goals of the manufacturer.

FIG. 4 illustrates the modular unit comprising a storage unit 16 (also shown in FIG. 2) removed from the rigid housing (shown at 18 in FIG. 2). The storage unit 16 is shown with the optional hinged top 24 and latches 26.

Since other modifications and changes can vary to fit particular operating requirements and environments and will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for storing, preserving and dispensing perishable and degradable food and goods comprising:
   a) a rigid housing;
   b) at least one modular unit removably disposed in said rigid housing for holding items, the modular unit comprising a storage unit and a drawer such that when the modular unit is removed from the rigid housing coolant and partial vacuum are retained in the modular unit, the storage unit being constructed and arranged to seal the drawer when the drawer is closed within the storage unit, such that when the drawer is opened coolant is retained between the storage unit and the rigid housing when the modular unit is disposed in the rigid housing;
   c) means operatively connected to, but physically removed from, said modular unit for creating a partial vacuum in the modular unit;
   d) means for sealing and maintaining said partial vacuum in the modular unit so that when the modular unit is removed from the rigid housing the partial vacuum is maintained in the modular unit; and
   e) means operatively connected to, but physically removed from, said modular unit for creating and maintaining a predetermined temperature in the rigid housing.

2. The apparatus for storing, preserving and dispensing perishable and degradable food and goods in accordance with claim 1, further comprising a plurality of modular units, all of said modular units being operatively connected to said means for creating a partial vacuum.

3. The apparatus for storing, preserving and dispensing perishable and degradable food and goods in accordance with claim 2, wherein said plurality of modular units are stacked one above the other.

4. The apparatus for storing, preserving and dispensing perishable and degradable food and goods in accordance with claim 1, further comprising: e) means operatively connected to, but physically removed from, said modular unit for creating and maintaining a predetermined range of humidity therein.

5. The apparatus for storing, preserving and dispensing perishable and degradable food and goods in accordance with claim 1, wherein said apparatus comprises one of the group: countertop apparatus and stand-alone apparatus.

6. The apparatus for storing, preserving and dispensing perishable and degradable food and goods in accordance with claim 1, wherein said apparatus is a compartment of a refrigerator.

7. The apparatus for storing, preserving and dispensing perishable and degradable food and goods in accordance with claim 1, wherein said modular unit is a processing unit that creates a partial vacuum in one-way valve containers and bags placed in the unit.

8. The apparatus for storing, preserving and dispensing perishable and degradable food and goods in accordance with claim 1, wherein said apparatus comprises a control panel that is programmable and provides preset environment settings to operate the apparatus and each operating system to create, regulate and maintain the temperature, vacuum and humidity levels, and combinations thereof, for the respective environments for each storage and processing unit.

9. The apparatus according to claim 1, further comprising at least one container or bag within the modular unit, the container or bag having a one-way valve such that when a partial vacuum is created within the modular unit a partial vacuum is also created within the container or bag and when the container or bag is removed from the modular unit the partial vacuum is maintained within the container or bag.

10. The apparatus according to claim 1, wherein a front of the drawer is external to the rigid housing.

11. A method for storing, preserving and dispensing perishable and degradable food and goods comprising the following steps:
   a) placing at least one item into at least one container or bag having a one-way valve that allows air to leave the container or bag and closing and sealing said at least one container or bag;
   b) placing said sealed container or bag into a modular unit and sealing the modular unit, the modular unit comprising a storage unit and a drawer, the storage unit being constructed and arranged to seal the drawer when the drawer is closed within the storage unit, such that when the drawer is opened coolant is retained between the storage unit and the rigid housing when the modular unit is disposed in the rigid housing;

c) placing the modular unit into a rigid housing if the modular unit is not already disposed in the rigid housing; and d) creating a partial vacuum environment within the modular unit, to in turn, create a partial vacuum within each one-way valve container or bag placed therein.

12. The method according to claim 11, further comprising creating a predetermined temperature in the modular unit and container or bag, wherein when the modular is removed from the rigid housing the partial vacuum is maintained, and wherein when the container or bag is removed from the modular unit the partial vacuum is maintained in the container or bag.

13. An apparatus for storing, preserving and dispensing perishable and degradable food and goods comprising:

a) a rigid housing;

b) a plurality of modular units removably disposed in said housing for holding items, the modular units being constructed and arranged so that the modular units can be removed from the rigid housing and moved to another rigid housing while maintaining a partial vacuum, at least one modular unit comprising a storage unit and a drawer, the storage unit being constructed and arranged to seal the drawer when the drawer is closed within the storage unit, such that when the drawer is opened coolant is retained between the storage unit and the rigid housing when the modular unit is diposed in the rigid housing;

c) means operatively connected to, but physically removed from, said modular units for creating a partial vacuum in the modular units;

d) means for sealing and maintaining said partial vacuum in the modular units so that when one of the modular units is removed from the rigid housing the partial vacuum is maintained in another modular unit disposed in the rigid housing;

e) means operatively connected to, but physically removed from, said modular units for creating a predetermined temperature in the rigid housing; and f) a control system for maintaining various temperatures and partial vacuums in the modular units.

14. The apparatus according to claim 13, further comprising a plurality of modular units each comprising a respective storage unit and drawer, wherein the modular units are stacked one above the other.

15. The apparatus according to claim 13, further comprising e) means operatively connected to, but physically removed from, said modular unit for creating and maintaining a predetermined range of humidity therein.

16. The apparatus according to claim 13, wherein said apparatus comprises a countertop apparatus or stand-alone apparatus.

17. The apparatus according to claim 13, wherein said apparatus is a compartment of a refrigerator.

18. The apparatus according to claim 13, further comprising at least one container or bag within the modular unit, the container or bag having a one-way valve such that when a partial vacuum is created within the modular unit a partial vacuum is also created within the container or bag and when the container or bag is removed from the modular unit the partial vacuum is maintained within the container or bag.

19. The apparatus according to claim 13, further comprising a control panel that is programmable and provides preset environment settings to operate the apparatus and each operating system to create, regulate and maintain the temperature, vacuum and humidity levels and combinations thereof, for the respective environments for each storage and processing unit.

20. The apparatus according to claim 13, wherein a front of the drawer is external to the rigid housing.

* * * * *